March 2, 1965 W. C. SCHUMACHER ETAL 3,171,702
SURFACE WIRING SYSTEM
Filed March 5, 1962 5 Sheets-Sheet 1

Inventors:
Walter C. Schumacher,
Fred G. vonHoorn
by Allard A. Bradlock
Their Attorney March 2, 1965 W. C. SCHUMACHER ETAL 3,171,702
SURFACE WIRING SYSTEM
Filed March 5, 1962 5 Sheets-Sheet 3

Inventors:
Walter C. Schumacher,
Fred G. vonHoorn
by Allard A. Braddock
Their Attorney March 2, 1965 W. C. SCHUMACHER ETAL 3,171,702
SURFACE WIRING SYSTEM
Filed March 5, 1962 5 Sheets-Sheet 4
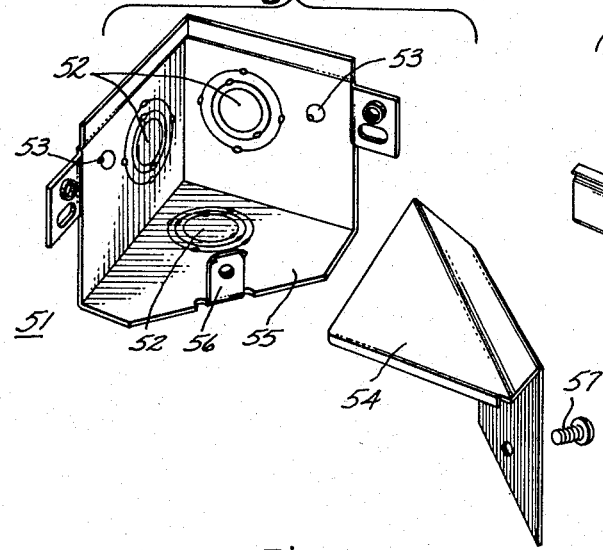
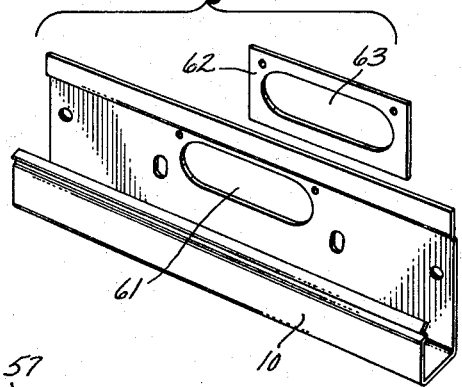
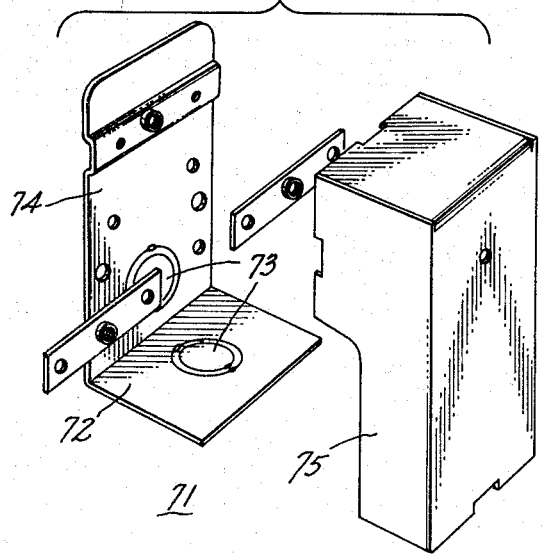
Inventors:
Walter C. Schumacher,
Fred G. von Hoorn
by Allard A. Braddock
Their Attorney Inventors:
Walter C. Schumacher,
Fred G. von Hoorn by Allard A. Braddock
Their Attorney

United States Patent Office 3,171,702
Patented Mar. 2, 1965

3,171,702
SURFACE WIRING SYSTEM
Walter C. Schumacher, Providence, and Fred G. von Hoorn, Warwick, R.I., assignors to General Electric Company, a corporation of New York
Filed Mar. 5, 1962, Ser. No. 177,326
5 Claims. (Cl. 339—22)

This invention relates to a surface wiring system. More particularly, the invention relates to a flexible wiring system which may readily be installed after completion of construction without being obtrusive.

Traditional systems of electrical wiring involve drilling through studs and snaking wires through walls. This involves a great deal of labor and the inaccessibility of wiring which has once been installed reduces the flexibility after installation and, in addition, increases the difficulty of repairs in the event of a wiring failure. Surface wiring systems which eliminate the snaking of wires through walls have been developed but for the most part their use has detracted from the appearance of the room in which they are located. Surface systems using sheet metal baseboards or moldings which leave a hollow interior through which wires may be run have been developed but have been rather complicated and their installation cost has been relatively high.

An object of the present invention is to provide a baseboard raceway system which is simple in design and easily cut to length during construction.

Another object of the present invention is to provide a sheet metal surface wiring raceway in which a channel member attached to a vertical surface maintains wires in position during construction while at the same time providing for their ready accessibility. A further object of the invention is to provide a baseboard surface wiring system requiring a minimum of change from conventional construction methods during installation.

The above and other objects are accomplished in accordance with the specification and drawing wherein—

FIG. 9 is an exploded perspective view of a corner junction box;

FIG. 10 is an exploded perspective view of a section of raceway containing a box fitting;

FIG. 11 is an exploded perspective view of a junction box;

Briefly stated, in accordance with one of its aspects, the present invention is directed to a baseboard wiring raceway comprising a channel member having a U-shaped cross-sectional configuration in which one leg is longer than the other, and a snap-on cover for the channel, the cover having about a 90-degree angular cross-sectional configuration the base portions of which engage the base portions of the channel legs.

Figure 1:
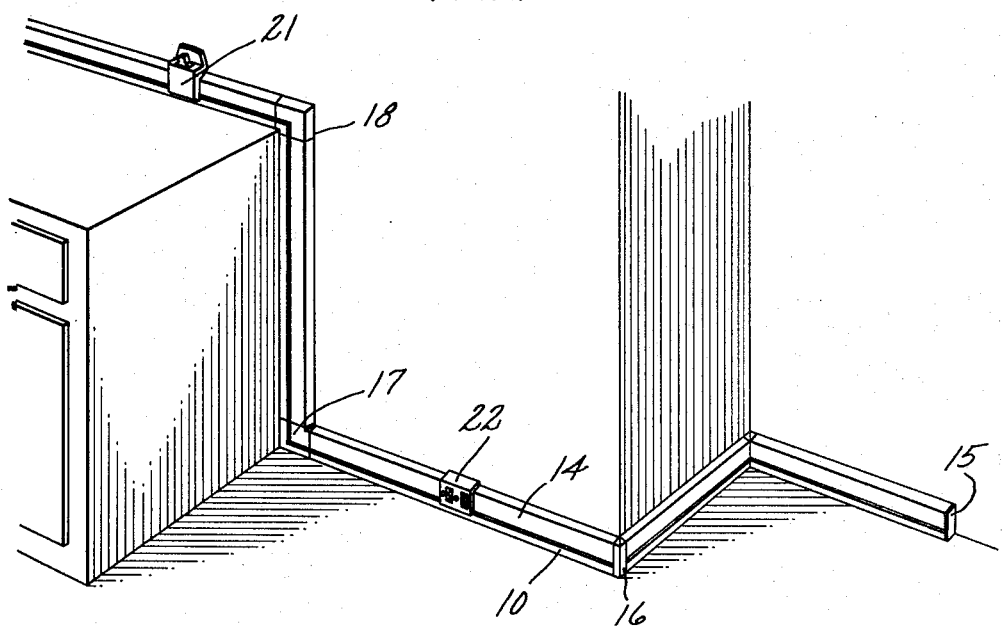
FIG. 1 is a perspective view of a section of a room equipped with the surface wiring of the present invention.
Figure 2:
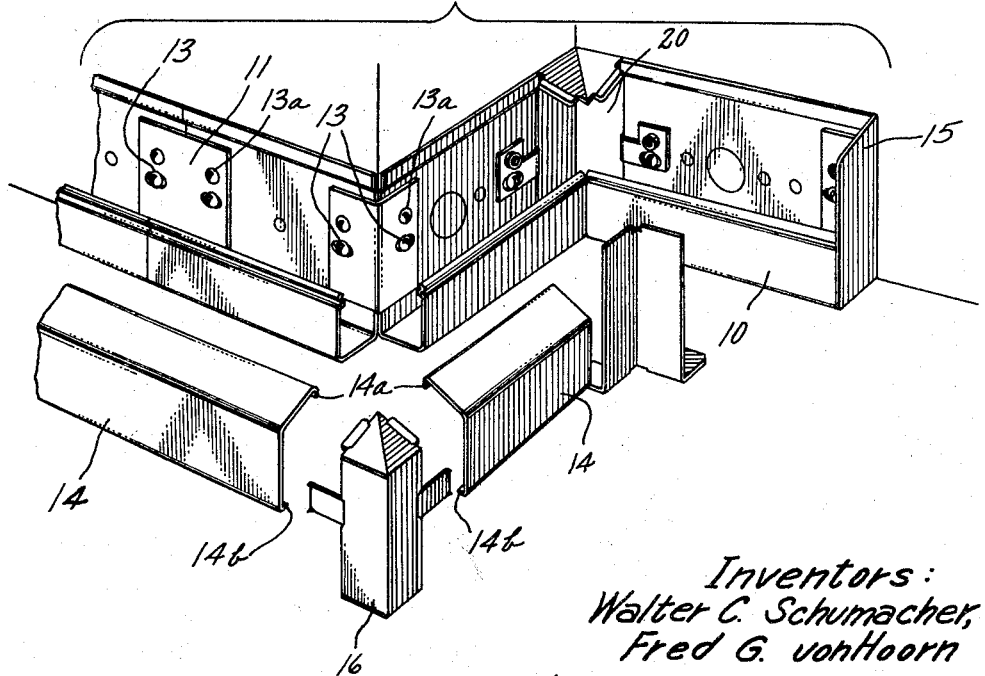
FIG. 2 is an enlarged exploded view of a portion of FIG. 1 with the cover plates removed.
Figure 3:
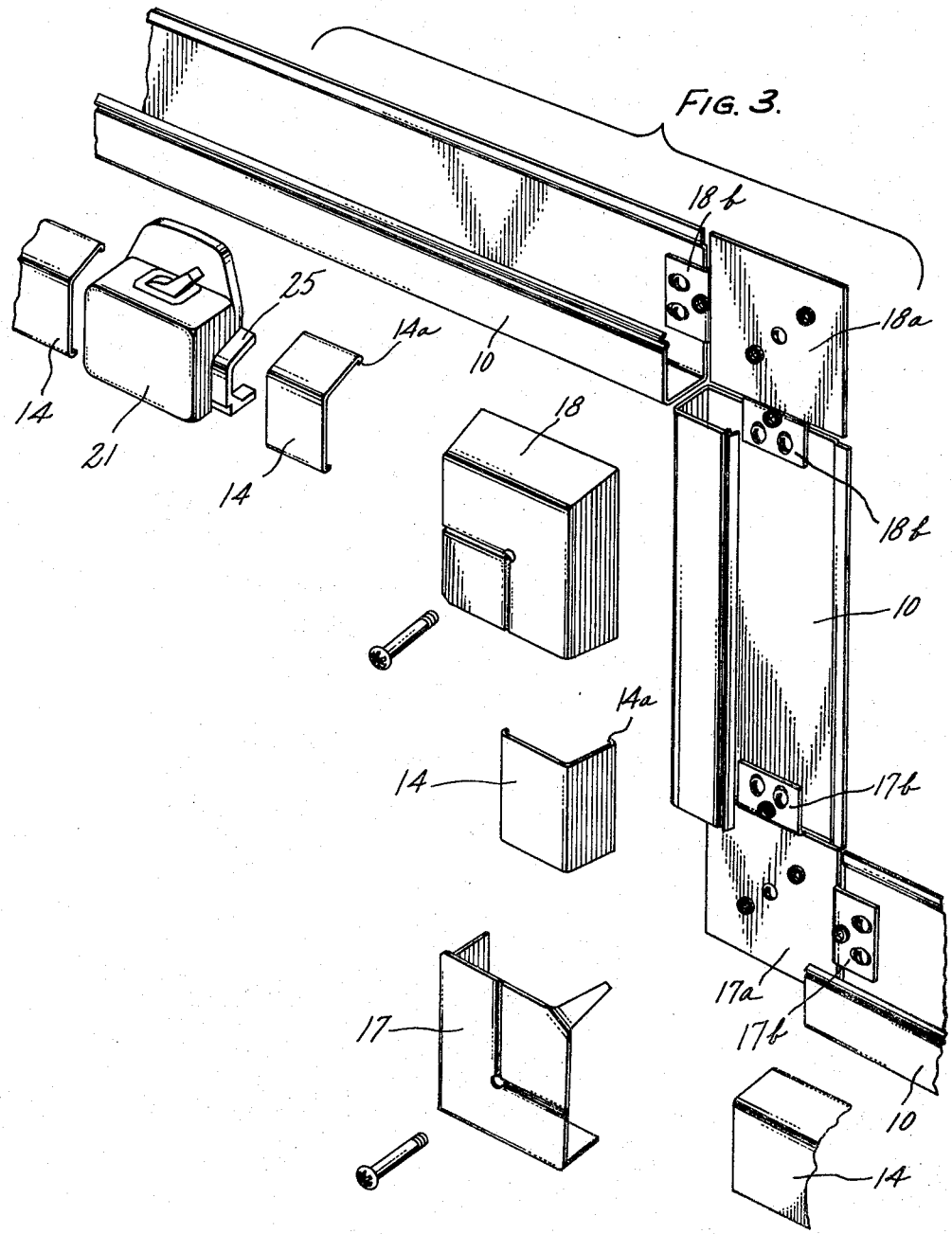
FIG. 3 is an exploded perspective view of an additional portion of FIG. 1 with the cover plates removed.
Figure 4:
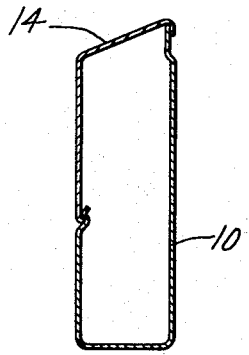
FIG. 4 is a sectional view through a straight run raceway.

FIGS. 1–3 illustrate a surface wiring installation in accordance with this invention wherein a raceway channel member 10 is fastened to a vertical wall surface by means of a series of anchor and coupling plates 11 through which a series of mounting screws 13 and grounding screws 13a extend. This provides continuous metal-to-metal contact which enables the channel members to function as a ground. The channel member 10 has a U-shaped cross-sectional configuration in which the leg along the wall is longer in order to provide access to the plates 11 and screws 13. The end of the leg abutting the wall is offset slightly in order to enable a cover piece 14 having a turned-over edge 14a to be in engagement therewith. The end of the exterior leg of the channel member 10 is folded to provide a groove which serves to seat a turned-over edge 14b on the cover 14. The cover 14 itself is of angular construction and is composed of sheet metal with the turned-over edges 14a and 14b separated from each other slightly less than the distance between the ends of the legs of the channel member 10. Thus, when the edge 14a is hooked over the base of the channel member 10 and the edge 14b snapped into the groove at the base of the other leg of the channel member 10, the springiness inherent in the sheet metal of the cover 14 will maintain the cover in position.

A feature of this invention is the accessibility for cutting of all surfaces of the channel member 10 and cover 14. The channel member 10 can readily be fitted to a surface by cutting along the legs with a hack saw.

In addition to straight runs provided by the channel member 10 and cover 14, the present system envisages end closure members 15, horizontal inside corner members 20, lower corner members 17, upper corner members 18, and outside corner members 16. Use of the horizontal corner members 16 and 20 enables channel members 10 and cover members 14 to be cut on the square rather than mitered thus reducing to a minimum the skill needed to make an installation having a neat appearance. The corner member 16 has positioning arms 16b barbed to pierce the finish on the raceway 10 to make grounding contact as best illustrated in FIG. 2.

As best shown in FIG. 3, the bottom corner 17 and top corner 18 are composed of channel members which mount upon plates 17a and 18a respectively. These plates are equipped with offset tabs 17b and 18b used in making attachment to the adjoining section of the channel 10.

Figure 5:
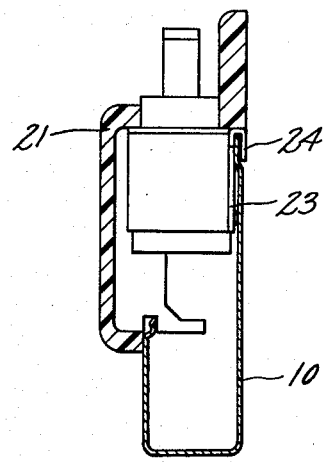
FIG. 5 is a view of a toggle switch positioned in a section of raceway.
Figure 6:
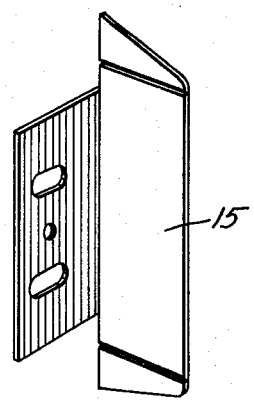
FIG. 6 is a perspective view of an end closure for use in the system of this invention.
Figure 7:
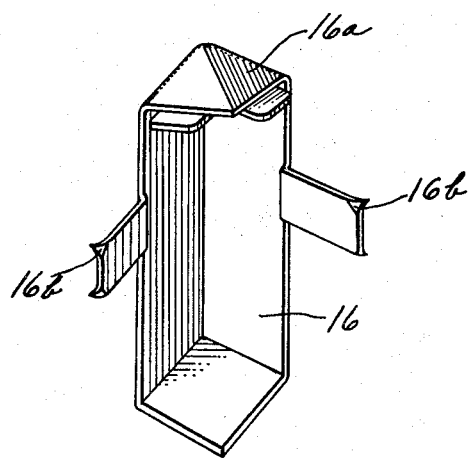
FIG. 7 is a perspective view of an outside corner piece.
Figure 8:
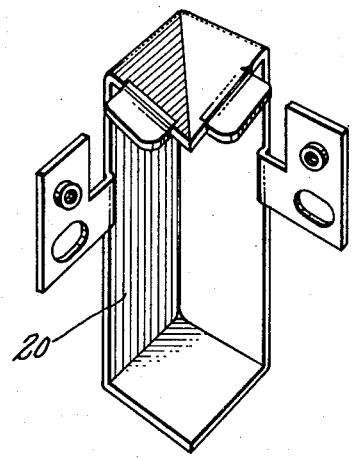
FIG. 8 is a perspective view of an inside corner piece.
Figure 12:
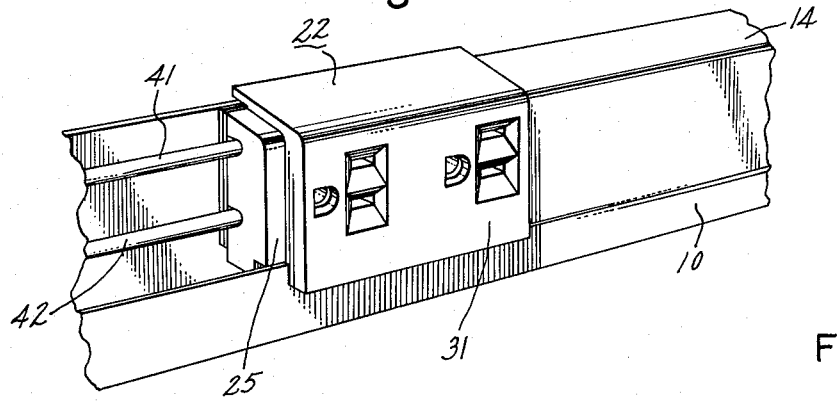
FIG. 12 is a perspective view of a convenience outlet positioned on a channel member.

Devices such as a toggle switch 21 (FIGS. 1 and 5), or outlet 22 (FIGS. 1, 12, and 13), are especially designed for ease of installation in conjunction with the surface wiring system of the present invention. Desirably, the devices are equipped with a back plate 23 lined on the interior with an insulating piece (not shown) and having a folded-over portion 24 which hooks on to the offset portion of the long leg of the channel member 10. The sides of the toggle switch 21 and outlet 22 have integral molded shoulder portions 25 (FIGS. 3, 12, and 13), which are shaped to conform with the interior surface of the cover member 14. During installation, the device is merely hooked into position on the back leg of the channel member 10 and wiring connections are made. When the cover member is snapped into position, it anchors the device in place. In order to add a device to an existing system, it is merely necessary to snap out a cover member 14, cut off section where the added device is to be positioned, connect in the device, and snap the sections of cover member 14 back into place. This flexibility greatly enhances the usefulness of the present invention.

Figure 13:
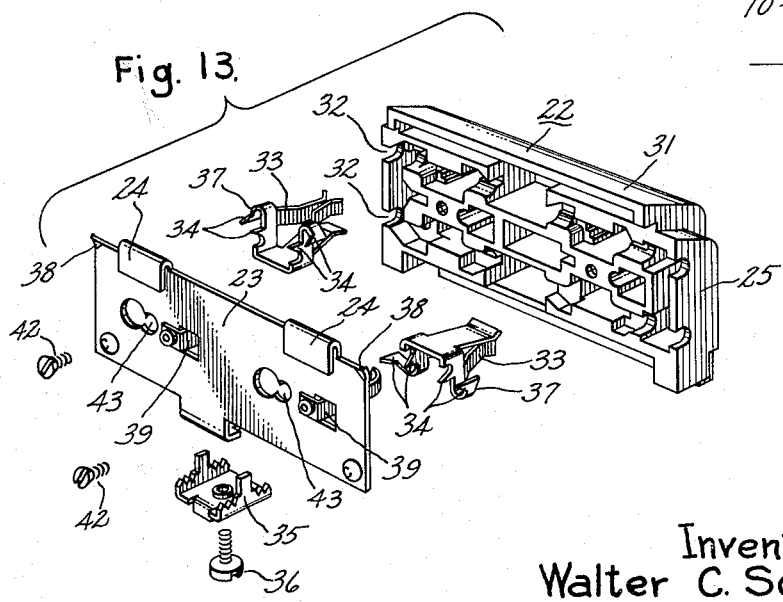
FIG. 13 is an exploded perspective view of the convenience outlet of FIG. 12 as seen from the reverse side.

FIG. 13 illustrates an outlet of a type which simplifies installation to the point that no wires need to be cut in order to install the outlet. The face portion of the outlet 22 is a plastic molding 31 which defines two through passageways 32 for wires. Each passageway leads past two cavities in which are positioned contact prongs 33 which have insulation-piercing prongs 34 extending into the passageway 32. While only two insulation-piercing contact prongs 33 are shown in FIG. 13, there are actually four—one for each prong-receiving opening of the device. It should be noted that each set of contact prongs 33 includes four insulation-piercing prongs 34—two immediately at the base of the contact prongs and two on extending curved end portions 37. The extending end portions impart a springiness to the insulation-piercing prongs mounted thereon to enable these prongs to pierce the insulation of #14 gauge and #12 gauge wire. If the connection is to #10 gauge wire, the insulation must be stripped in the contact area. The passageways 32 are open in order to accommodate split wiring.

The outlet 22 also includes an insulation-piercing grounding terminal 35 which is connected to the back plate 23 by means of a terminal screw 36. Grounding contact is made through either a ground wire connected to the terminal 35 or through the sharp corners 38 of the back plate 23. These corners readily penetrate any paint on the raceway 10 to establish grounding contact between the raceway and the plate. Attached to the back plate 23, as by riveting or welding, are a pair of ground prongs 39 which extend into cavities in the molded part 31 when this part is connected to the back plate 23 to provide contact with the grounding prongs of a plug.

In connecting the outlet 22 to a circuit the wires 41 and 42 (FIG. 12) are run into the passageways 32 and the back plate 23 is then drawn into tight engagement with the molded part 31 by means of screws 42 the heads of which protrude through apertures 43 in the back plate 23. The insulation-piercing prongs 34 penetrate the insulation of the wires 41 and 42 as a result of the pressure of the back plate against these wires. The back plate is then hung in position on the raceway 10 by means of the folded-over portions 24.

Figure 14:
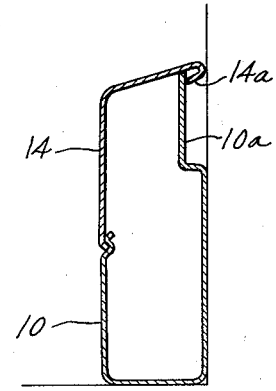
FIG. 14 is a sectional view of a double-channel raceway member.

FIG. 14 illustrates a construction of channel member 10 in which an offset 10a has a greater-than-normal offset in order to provide an auxiliary wiring channel between the offset and the wall. In this embodiment the cover member 14 has a folded-over portion 14a which serves to contact the back side of the offset 10a and seal the top of the auxiliary wiring channel. The auxiliary channel is used for low voltage control wires in a remote control wiring system. Thus, the power wires and low-voltage control wires are partitioned from each other. This separation enables the surface wiring system of this invention to meet requirements of the National Electrical Code pertaining to remote control systems.

FIGS. 9, 10 and 11 illustrate various types of junction boxes which are used in the surface wiring system of this invention. In FIG. 9, a corner junction box 51 consists of a base 55 which has three large variable sized knockouts 52 as well as two small knockouts 53 which may be used for fastening screws or nails. The base 55 has dimensions mating with those of the raceway 10. A cover member 54 is fastened in angled relationship to the base 55 by means of a tab 56 and screw 57. When the cover 54 is in place the box 51 becomes an inconspicuous part of the surface wiring system of this invention.

FIG. 10 illustrates a box fitting which is part of a standard raceway unit 10. In this embodiment, the raceway 10 is equipped with an aperture 61 and a fibrous insulating piece 62 having an aperture 63 coextensive with the aperture 61. The wiring (not shown) is brought into the raceway 10 by way of the apertures 61 and 63.

FIG. 11 illustrates a junction box 71 which fits over a raceway section 10 and provides more room on the interior than the arrangements of FIGS. 9 and 10. A base member 72 containing a pair of knockouts 73 has a back portion 74 which extends above the back portion of the raceway 10. The bottom portion of the base member extends beyond the raceway 10. A cover member 75 has sides which extend farther at the top than at the bottom in order to provide an entry passage from the raceway 10 and cover member 14. While the box of FIG. 11 is the most conspicuous of those illustrated in FIGS. 9, 10, and 11 it provides additional space for wiring and is still not objectionably conspicuous.

While the invention has been described with reference to certain specific embodiments, it is obvious that there can be variations which still fall within the true spirit of the invention. Therefore, the invention should be limited in scope only as may be necessitated by the scope of the appended claims.

What we claim as new and desire to secure by Letters Patent of the United States is:

1. A baseboard raceway system comprising, in combination, a channel member of J-shaped cross sectional configuration integrally formed by a long upright leg adapted for attachment to a vertical surface and a short upright leg spaced from said long leg by a conjoining bottom piece, snap-fit cover sections having an angular cross sectional configuration, said cover sections engaging the upper edges of said long and short legs of said channel member to provide in combination with said channel member a concealed wiring raceway, at least one electrical element mounted on said channel member, said element carrying a folded-over tab for engaging the upper edge of said long leg with the bottom surface of said element resting on the upper edge of said short leg, and shoulders formed on said electrical element in underlying engagement with adjacent ends of said cover sections.

2. The combination claimed in claim 1 wherein a recess is formed in the bottom surface of said element for receiving the upper edge of said short leg.

3. The combination claimed in claim 1 wherein said element carries plural folded-over tabs for engaging the upper edge of said long leg.

4. A baseboard raceway system comprising a channel member having a J-shaped cross-sectional configuration formed by a short leg and a longer leg spaced from said short leg by a conjoining bottom piece, the longer leg being adapted to attach said channel member to a vertical surface, snap-fit cover sections of angular cross-sectional configuration for said channel, the base portions of said cover sections being engageable with the base portions of said channel legs, and at least one convenience outlet mounted on said channel member, said outlet consisting of a metal back plate having folded-over tabs on one side for hanging said outlet onto said channel member, a molded plastic face element attachable to said back plate by means of screws, said face element including cavities for contact elements and shoulders for engaging adjacent ends of said cover sections, and a plurality of contact elements in said cavities, said contact elements having prong portions to accommodate the prongs of attachment plugs and oppositely disposed insulation-piercing prongs to enable electrical contact to be made between said contact elements and conductors when said back plate is tightened against said face element.

5. A baseboard raceway system as claimed in claim 4 wherein each outlet contact element has four insulation-piercing prongs and these prongs lie in lateral grooves extending through the face element on the back plate side.

References Cited by the Examiner

UNITED STATES PATENTS

| | | | |
|---|---|---|---|
| 1,965,170 | 7/34 | Benjamin | 339—22 |
| 1,995,855 | 3/35 | Lee et al. | 339—23 X |
| 2,023,004 | 12/35 | Clayton | 339—22 |
| 2,076,558 | 3/37 | Hartman et al. | 339—21 X |
| 2,132,400 | 10/38 | Curren | 339—23 X |
| 2,425,802 | 8/47 | Harris et al. | 339—91 |
| 2,489,956 | 11/49 | Crook | 339—23 |
| 2,740,429 | 4/56 | Parks | 339—22 X |
| 2,865,010 | 12/58 | Taylor | 339—164 X |
| 2,892,174 | 6/59 | Benadner | 339—99 |
| 2,930,021 | 3/60 | Hasselhorn et al. | 339—99 |
| 2,969,518 | 1/61 | Slater | 339—31 |
| 3,003,132 | 10/61 | Johnson et al. | 339—23 |

FOREIGN PATENTS 569,697   6/45   Great Britain.

JOSEPH D. SEERS, *Primary Examiner.*

M. HENSON WOOD, Jr., *Examiner.*